US012482990B2

(12) United States Patent
Huang et al.

(10) Patent No.: US 12,482,990 B2
(45) Date of Patent: Nov. 25, 2025

(54) CONNECTOR, USED IN PRINTED CIRCUIT BOARD, COMPRISES A BODY, METAL-MADE CONTACTS, A SHIELD COVER, A TUBULAR PORTION, CONTACT PORTIONS, A FITTING PORTION, MOUNTING TERMINALS, CIRCUIT BOARD, AND CONTACT PIECES

(71) Applicants: Tyco Electronics (Suzhou) Ltd., Suzhou (CN); Tyco Electronics Technology (SIP) Ltd., Suzhou (CN)

(72) Inventors: Jianlin Huang, Suzhou (CN); Feng (Carlos) Pan, Suzhou (CN); Weiguo (Vic) Sun, Suzhou (CN)

(73) Assignees: Tyco Electronics Technology (SIP) Ltd., Suzhou (CN); Tyco Electronics (Suzhou) Ltd., Suzhou (CN)

( * ) Notice: Subject to any disclaimer, the term of this patent is extended or adjusted under 35 U.S.C. 154(b) by 398 days.

(21) Appl. No.: 18/148,475

(22) Filed: Dec. 30, 2022

(65) Prior Publication Data

US 2023/0216251 A1 Jul. 6, 2023

(30) Foreign Application Priority Data

Dec. 31, 2021 (CN) ......................... 202123423533.5

(51) Int. Cl.
*H01R 13/6581* (2011.01)
*H01R 13/6594* (2011.01)

(52) U.S. Cl.
CPC ..... *H01R 13/6581* (2013.01); *H01R 13/6594* (2013.01)

(58) Field of Classification Search
CPC ........................ H01R 13/6581; H01R 13/6594
USPC ...................................................... 439/607.58
See application file for complete search history.

(56) References Cited

U.S. PATENT DOCUMENTS 4,598,961 A * 7/1986 Cohen .................... H01R 24/50 439/877
6,354,875 B1 * 3/2002 Wu ...................... H01R 13/658 439/108
6,468,108 B1 * 10/2002 Wu .................... H01R 12/7029 439/567

(Continued)

FOREIGN PATENT DOCUMENTS

CN 201252259 Y * 6/2009 ....... H01R 13/65802
CN 111801849 A * 10/2020 ........... H01R 12/724

(Continued)

OTHER PUBLICATIONS

Extended European Search Report dated May 12, 2023, corresponding to Application No. 22216947.6-1201, 32 pages.

(Continued)

*Primary Examiner* — Peter G Leigh
(74) *Attorney, Agent, or Firm* — Barley Snyder

(57) ABSTRACT

An electrical connector comprises a housing, a shield arranged within the housing and a first signal terminal. The shield includes a first shielding part extending in a first direction, and a second shielding part integrally connected to the first shielding part and extending in a second direction at a predetermined angle to the first direction. The first signal terminal is provided in the housing and is at least partially accommodated within the shield.

19 Claims, 4 Drawing Sheets

(56) References Cited

U.S. PATENT DOCUMENTS

| | | | | |
|---|---|---|---|---|
| 7,137,825 | B2 * | 11/2006 | Myer | H01R 24/50 439/63 |
| 7,938,683 | B2 * | 5/2011 | Nagata | H01R 13/6582 439/607.13 |
| 9,385,480 | B2 * | 7/2016 | Miyoshi | H01R 13/6581 |
| 9,401,567 | B2 * | 7/2016 | Miyoshi | H01R 13/6594 |
| 10,637,185 | B2 * | 4/2020 | Mori | H01R 13/6581 |
| 11,563,291 | B2 | 1/2023 | Gilkey et al. | |
| 2001/0049225 | A1 * | 12/2001 | Chiran | H01R 13/6581 439/582 |
| 2007/0224883 | A1 * | 9/2007 | Chan | H01R 13/6586 439/607.01 |
| 2008/0057791 | A1 | 3/2008 | Long et al. | |
| 2009/0253298 | A1 * | 10/2009 | Kameyama | H01R 12/724 439/607.41 |
| 2010/0003852 | A1 * | 1/2010 | Myer | H01R 13/6582 439/607.17 |
| 2010/0233905 | A1 * | 9/2010 | Nagata | H01R 12/724 439/607.13 |
| 2011/0045693 | A1 | 2/2011 | Uchida | |
| 2015/0024630 | A1 * | 1/2015 | Miyoshi | H01R 13/506 439/607.01 |
| 2015/0263457 | A1 * | 9/2015 | Miyoshi | H01R 13/506 439/607.27 |
| 2021/0066857 | A1 * | 3/2021 | Gilkey | H01R 13/6477 |

FOREIGN PATENT DOCUMENTS

| | | | | |
|---|---|---|---|---|
| DE | 102020202729 | A1 | 9/2021 | |
| EP | 2466692 | A1 * | 6/2012 | H01R 12/724 |
| EP | 2827459 | A1 * | 1/2015 | H01R 13/506 |
| EP | 2919329 | A1 * | 9/2015 | H01R 13/506 |
| JP | 4194555 | B2 * | 12/2008 | H01R 24/42 |

OTHER PUBLICATIONS

European Patent Office Examination Report dated Apr. 17, 2025, corresponding to Application No. 22 216 947.6-1201, 10 pages.

* cited by examiner

CONNECTOR, USED IN PRINTED CIRCUIT BOARD, COMPRISES A BODY, METAL-MADE CONTACTS, A SHIELD COVER, A TUBULAR PORTION, CONTACT PORTIONS, A FITTING PORTION, MOUNTING TERMINALS, CIRCUIT BOARD, AND CONTACT PIECES

CROSS-REFERENCE TO RELATED APPLICATIONS

This application claims the benefit of Chinese Patent Application No. CN202123423533.5 filed on Dec. 31, 2021 in the State Intellectual Property Office of China, the whole disclosure of which is incorporated herein by reference.

FIELD OF THE INVENTION

The present invention relates to a shield, a connector including the shield, and a connector assembly including the connector.

BACKGROUND

A known connector for a laser radar system generally includes a housing, a power supply terminal provided in the housing for transmitting power, and a signal terminal for transmitting signals (e.g., an Ethernet signal). In order to prevent signal interference between the signal terminal and the power supply terminal, it is necessary to provide a shield around the signal terminal. In the case of a right-angle configuration of the connector, the shield usually comprises of two separate shielding parts, which are perpendicular to each other with their adjacent ends affixed together. However, the use of two separate shielding parts increases the complexity of the structure, as well as the difficulty in assembling the connector. Moreover, a two-part shield reduces electromagnetic shielding performance.

SUMMARY

According to an embodiment of the present disclosure, an electrical connector comprises a housing, a shield arranged within the housing and a first signal terminal. The shield includes a first shielding part extending in a first direction, and a second shielding part integrally connected to the first shielding part and extending in a second direction at a predetermined angle to the first direction. The first signal terminal is provided in the housing and is at least partially accommodated within the shield.

BRIEF DESCRIPTION OF THE DRAWINGS

The invention will now be described by way of example with reference to the accompanying Figures, of which.

DETAILED DESCRIPTION OF THE EMBODIMENTS

Figure 1:
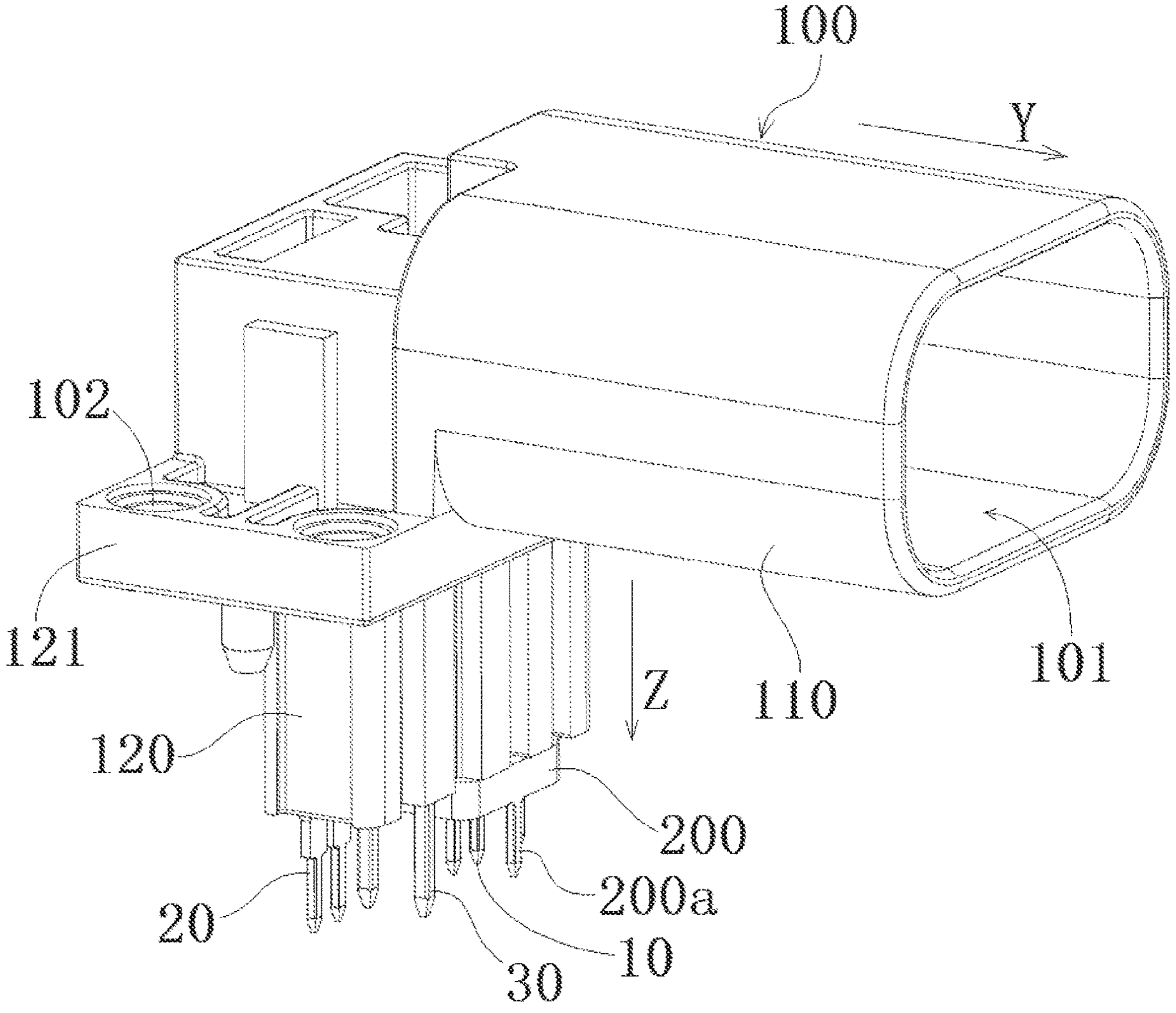
FIG. 1 shows an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a shield comprises a first shielding part extending in a first direction, and a second shielding part integrally connected to the first shielding part and extending in a second direction at a predetermined angle to the first direction. According to another aspect of the present disclosure, a connector comprises a housing, the above-described shield arranged in the housing, and a first signal terminal provided in the housing and at least partially accommodated within the shield.

Figure 2:
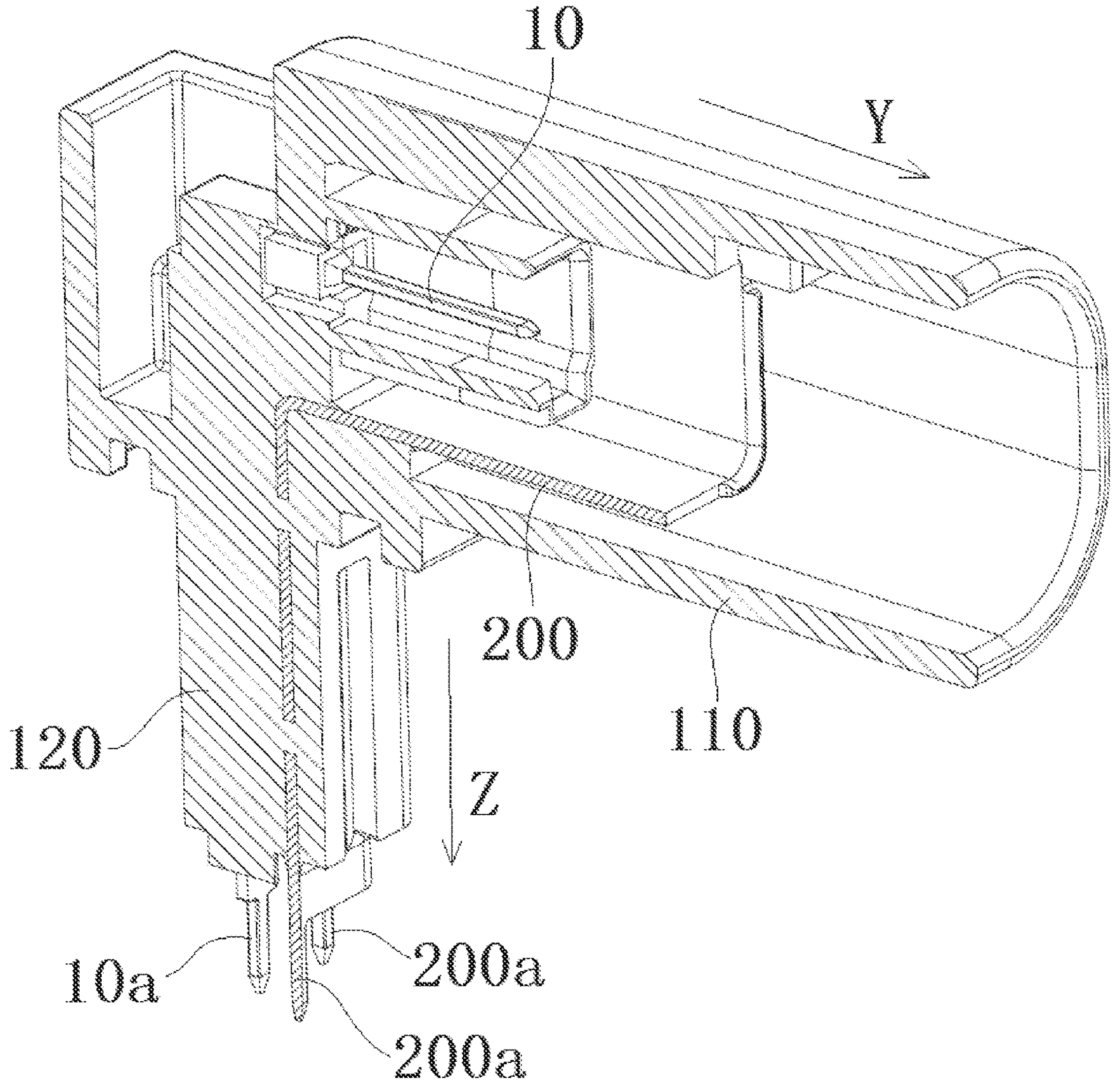
FIG. 2 shows a cross-sectional view of a connector according to an exemplary embodiment of the present invention.
Figure 3:
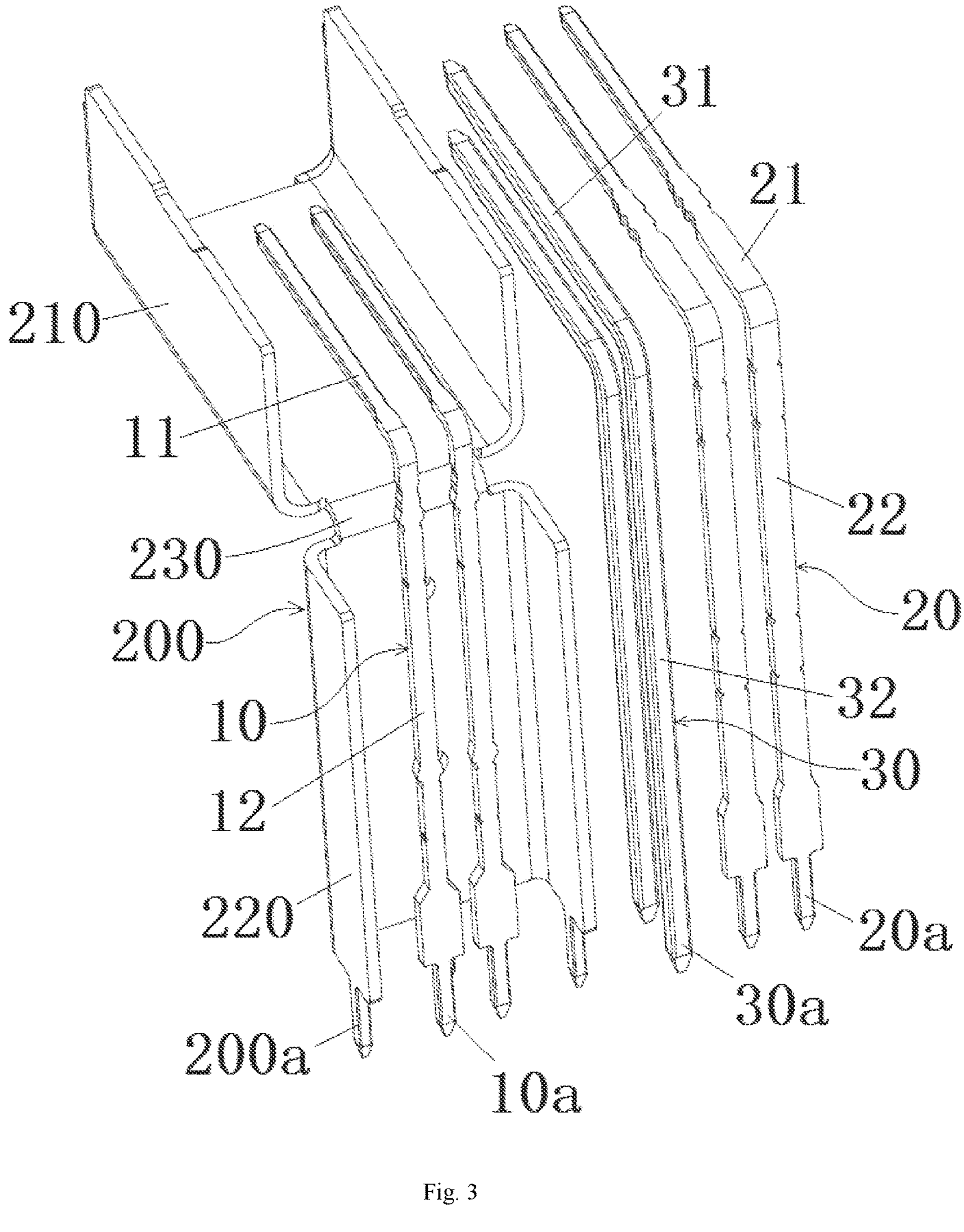
FIG. 3 shows an illustrative view of a shield and a terminal of a connector according to an exemplary embodiment of the present invention.
Figure 4:
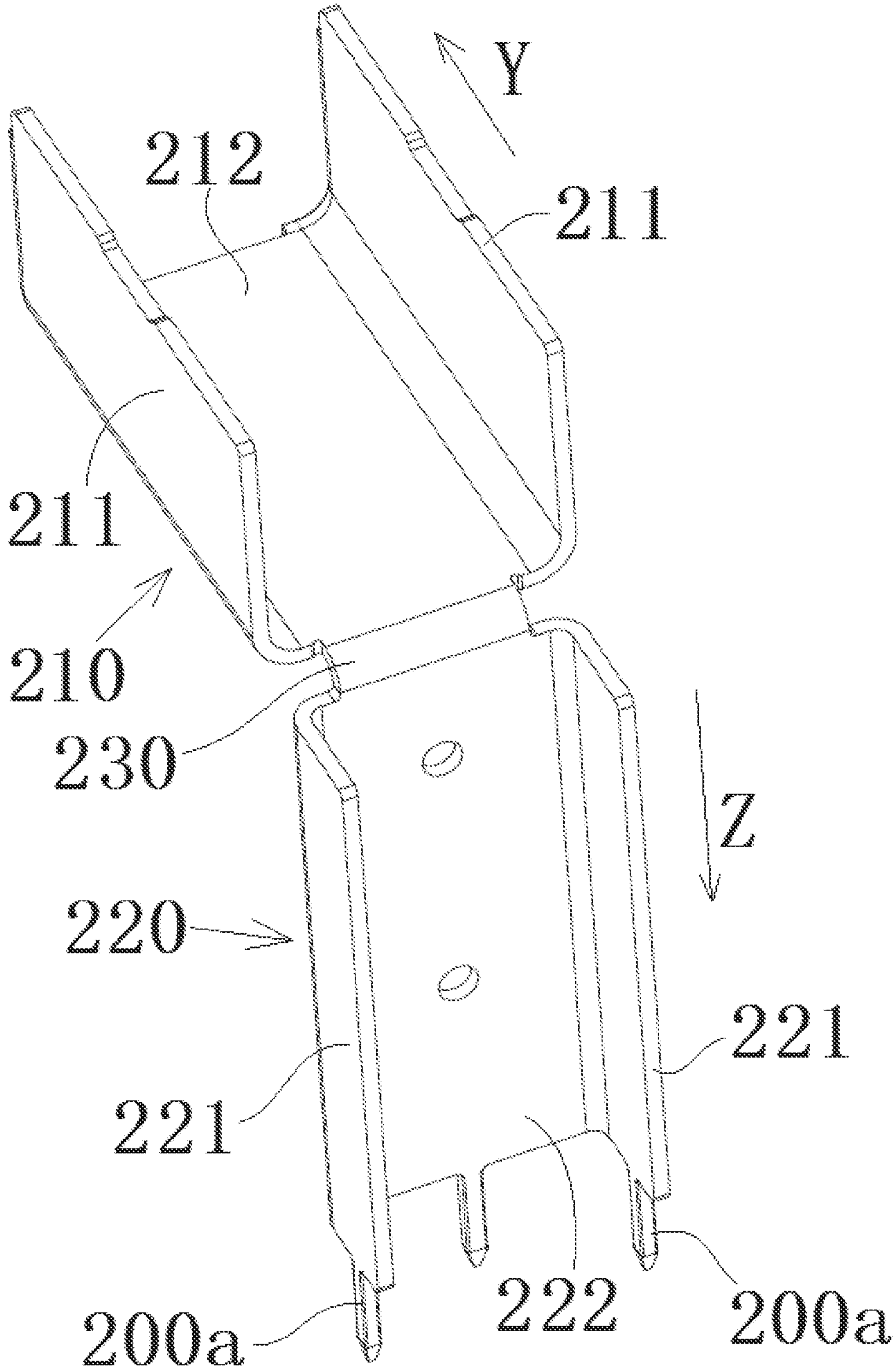
FIG. 4 shows an illustrative perspective view of a shield of a connector according to an exemplary embodiment of the present invention.

FIG. 1 shows an illustrative perspective view of a connector according to an exemplary embodiment of the present invention. FIG. 2 shows a cross-sectional view of a connector according to an exemplary embodiment of the present invention. FIG. 3 shows an illustrative view of a shield and terminals of a connector according to an exemplary embodiment of the present invention. FIG. 4 shows a perspective view of a shield of a connector according to an exemplary embodiment of the present invention.

As shown in FIGS. 1-4, a connector suitable for connection with, for example, laser radar system is disclosed. The connector may include a power terminal for transmitting power and a signal terminal for transmitting signals (e.g., Ethernet signals). The connector comprises a housing 100, a shield 200, and a first signal terminal 10. The shield 200 is provided within the housing 100. The first signal terminal 10 is provided in the housing 100 and is at least partially accommodated in the shield 200.

The shield 200 includes a first shielding part 210 and a second shielding part 220. The first shielding part 210 extends in the first direction Y. The second shielding part 220 is connected to the first shielding part 210 and extends in the second direction Z at a predetermined angle to the first direction Y. In the exemplary embodiment, the shield 200 is an integrally formed part. For example, the shield 200 may be an integral press molded part made by stamping a single metal sheet, or may be an integral cast part made by a casting process, or may be an integral machined part made by machining.

The angle between the first direction Y and the second direction Z may be greater than 0 degrees and less than 180 degrees. In the illustrated embodiment, the angle between the first direction Y and the second direction Z is equal to 90 degrees, such that the first shielding part 210 and the second shielding part 220 are oriented perpendicularly to each other. However, the present invention is not limited to the illustrated embodiment. For example, the angle between the first direction Y and the second direction Z may be equal to 30 degrees, 45 degrees, 60 degrees, 120 degrees, 145 degrees, or any other suitable angle.

The first shielding part 210 includes a pair of first side walls 211 and a first bottom wall 212. The first bottom wall 212 is connected between the bottoms of the pair of first side walls 211. In this way, the cross-section of the first shielding part 210 perpendicular to the first direction Y is U-shaped. However, the present invention is not limited to the illustrated embodiment. For example, in another exemplary embodiment of the present invention, the first shielding part 210 may further include a first top wall connected between the tops of the pair of first side walls 211. In this case, the cross-section of the first shielding part 210 perpendicular to the first direction Y comprises a rectangular frame shape.

The second shielding part 220 includes a pair of second side walls 221 and a second bottom wall 222. The second bottom wall 222 is connected between the bottoms of the pair of second side walls 221. In this way, the cross-section of the second shielding part 220 perpendicular to the second direction Z has a U-shape. However, the present invention is not limited to the illustrated embodiment. For example, in another exemplary embodiment of the present invention, the second shielding part 220 may further include a second top wall connected between the tops of the pair of second side walls 221. In this case, the cross-section of the second shielding part 220 perpendicular to the second direction Z would comprise a rectangular frame shape, as would be recognized by one of ordinary skill in the art in view of this description.

The shield 200 further includes a shield connection part 230. The shield connection part 230 is connected between the first shielding part 210 and the second shielding part 220. In the illustrated embodiment, the shield connection part 230 is bent into a predetermined shape so that both ends thereof face the first direction Y and the second direction Z, respectively. Both ends of the shield connection part 230 are connected to one end of the first shielding part 210 and the second shielding part 220, respectively. In the illustrated embodiment, the shield connection part 230 is an arc-shaped transition portion that transitions from the first direction Y to the second direction Z.

According to one embodiment, the shield connection part 230 is in a curved plate shape and is connected between the bottom walls 212 and 222 of the first shielding part 210 and the second shielding part 220. However, the present invention is not limited to the illustrated embodiment, and the shield connection part 230 may also connect at least one of the bottom walls 212, 222, the side walls 211, 221, and the top walls of the first shielding part 210 and the second shielding part 220. For example, the shield connection part 230 may be a curved, U-shaped or rectangular frame shaped, which may simultaneously connect the bottom walls 212, 222 and the side walls 211, 221 and/or the top walls of the first shielding part 210 and the second shielding part 220.

The shield 200 further includes at least one connection pin 200*a*. The connection pin 200*a* is used for electrically connecting to a circuit board. In the illustrated embodiment, the connection pin 200*a* is connected to the end face of the distal end of the second shielding part 220. However, the present invention is not limited to the illustrated embodiment. For example, the connection pin 200*a* may be connected to the end surface of at least one of the ends of the first shielding part 210 and the second shielding part 220.

According to another embodiment of the present disclosure, a connector includes the housing 100, the shield 200 and the first signal terminal 10. The shield 200 is provided in the housing 100. The first signal terminal 10 is provided in the housing 100 and at least partially accommodated within the shield 200. The first signal terminal 10 includes a first terminal part 11 and a second terminal part 12. The first terminal part 11 of the first signal terminal 10 extends in the first direction Y. The second terminal part 12 of the first signal terminal 10 is connected to the first terminal part 11 and extends in the second direction Z. The first terminal part 11 and the second terminal part 12 of the first signal terminal 10 are accommodated in the first shielding part 210 and the second shielding part 220 of the shield 200, respectively.

The housing 100 includes a first housing part 110 and a second housing part 120. The first housing part 110 extends in the first direction Y. The second housing part 120 is connected to the first housing part 110 and extends in the second direction Z. The first shielding part 210 of the shield 200 and the first terminal part 11 of the first signal terminal 10 are provided in the first housing part 110. The second shielding part 220 of the shield 200 and the second terminal part 12 of the first signal terminal 10 are provided in the second housing part 120.

The connector further includes a second signal terminal 20 and a power supply terminal 30. The second signal terminal 20 is provided in the housing 100 and located outside the shield 200. The power supply terminal 30 is provided in the housing 100 and is located outside the shield 200. Therefore, in the illustrated embodiment, the shield 200 isolates the first signal terminal 10 from the second signal terminal 20 and the power supply terminal 30.

The first signal terminal 10 and the second signal terminal 20 are operative to transmit different signals. For example, the first signal terminal 10 is used to transmit Ethernet signals, and the second signal terminal 20 is used to transmit LAN signals. In the illustrated embodiment, the power supply terminal 30 is arranged in a region between the first signal terminal 10 and the second signal terminal 20.

The second signal terminal 20 includes a first terminal part 21 and a second terminal part 22 extending along the first direction Y and the second direction Z, respectively. The power supply terminal 30 includes a first terminal part 31 and a second terminal part 32 extending in the first direction Y and the second direction Z, respectively. The first terminal part 21 of the second signal terminal 20 and the first terminal part 31 of the power supply terminal 30 are provided in the first housing part 110. The second terminal part 22 of the second signal terminal 20 and the second terminal part 32 of the power supply terminal 30 are provided in the second housing part 120.

The shield 200, the first signal terminal 10, the second signal terminal 20 and the power supply terminal 30 further include connection pins 200*a*, 10*a*, 20*a*, and 30*a*, respectively. The connection pins 200*a*, 10*a*, 20*a*, 30*a* of the shield 200, the first signal terminal 10, the second signal terminal 20, and the power supply terminal 30 exposed from the housing 100 to be electrically connected to a circuit board.

Although not shown, in an exemplary embodiment of the present invention, there is also disclosed a connector assembly including the aforementioned connector and a mating connector (not shown) adapted to mate with the aforementioned connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A shield, comprising:
a first shielding part extending in a first direction; and
a second shielding part integrally connected to the first shielding part and extending in a second direction at a predetermined angle to the first direction, the second shielding part comprising:
a pair of second side walls;
a second top wall connected between the tops of the pair of second side walls.

2. The shield according to claim 1, wherein an angle between the first direction and the second direction is greater than 0 degrees and less than 180 degrees.

3. The shield according to claim 1, wherein an angle between the first direction and the second direction is equal to 90 degrees such that the first shielding part and the second shielding part are oriented perpendicular to each other.

4. The shield according to claim 1, wherein at least one of:
the cross-section of the first shielding part perpendicular to the first direction is a U-shape or a rectangular shape; or
the cross-section of the second shielding part perpendicular to the second direction is a U-shape or a rectangular shape.

5. The shield according to claim 1, wherein the first shielding part comprises:
a pair of first side walls; and
a first bottom wall connected between the bottoms of the pair of first side walls.

6. The shield according to claim 5, wherein the first shielding part further comprises a first top wall connected between the tops of the pair of first side walls.

7. The shield according to claim 1, wherein the second shielding part further comprises:
a second bottom wall connected between the bottoms of the pair of second side walls.

8. The shield according to claim 1, further comprising a shield connection part connected between the first shielding part and the second shielding part.

9. The shield according to claim 8, wherein:
the shield connection part is bent into a predetermined shape such that both ends thereof face the first direction and the second direction, respectively; and
both ends of the shield connection part are connected to one end of the first shielding part and one end of the second shielding part, respectively.

10. The shield according to claim 8, wherein the shield connection part connects at least one of bottom walls, side walls or top walls of the first shielding part and the second shielding part.

11. The shield according to claim 8, wherein the shield connection part formed in a curved plate shape and is connected between the bottom walls of the first shielding part and the second shielding part.

12. The shield according to claim 1, further comprising a connection pin adapted to electrically connect to a circuit board, the connection pin connected to an end surface of an end of at least one of the first shielding part or the second shielding part.

13. A connector, comprising:
a housing having a first housing part extending in a first direction and a second housing part connected to the first housing part and extending in a second direction;
a shield arranged within the housing, comprising:
a first shielding part extending in the first direction; and
a second shielding part integrally connected to the first shielding part and extending in the second direction at a predetermined angle to the first direction; and
a first signal terminal provided within the housing and at least partially accommodated within the shield.

14. The connector according to claim 13, wherein the first signal terminal comprises:
a first terminal part extending in the first direction; and
a second terminal part connected to the first terminal part and extending in the second direction, wherein the first terminal part and the second terminal part of the first signal terminal are accommodated in the first shielding part and the second shielding part of the shield, respectively.

15. The connector according to claim 13, wherein the housing comprises:
the first shielding part of the shield and the first terminal part of the first signal terminal provided in the first housing part; and
the second shielding part of the shield and the second terminal part of the first signal terminal provided in the second housing part.

16. The connector according to claim 13, further comprising at least one of:
a second signal terminal provided in the housing and located outside the shield; and
a power supply terminal provided in the housing and located outside the shield.

17. The connector according to claim 16, wherein the first signal terminal and the second signal terminal are adapted to transmit different signals.

18. The connector according to claim 16, wherein at least one of:
the second signal terminal includes a first terminal part and a second terminal part extending in the first direction and the second direction, respectively; and
the power supply terminal includes a first terminal part and a second terminal part extending in the first direction and the second direction, respectively.

19. The connector according to claim 16, wherein the shield, the first signal terminal, the second signal terminal and the power supply terminal further include connection pins, respectively, which are exposed from the housing to be connected to a circuit board.

* * * * *